United States Patent [19]

Minagawa

[11] 4,345,778

[45] Aug. 24, 1982

[54] SUSPENSION FOR VEHICLES

[75] Inventor: Masaaki Minagawa, Kokubunji, Japan

[73] Assignee: Honda Giken Kogyo Kabushiki Kaisha, Tokyo, Japan

[21] Appl. No.: 87,965

[22] Filed: Oct. 25, 1979

[30] Foreign Application Priority Data

Oct. 27, 1978 [JP] Japan .............................. 53-132389

[51] Int. Cl.³ .............................................. B60G 3/00
[52] U.S. Cl. ..................................... 280/701; 280/668
[58] Field of Search .................... 280/95 R, 96.1, 660, 280/663, 666, 670, 668, 673, 675, 690, 691, 688, 696, 701, 724, 725

[56] References Cited

U.S. PATENT DOCUMENTS 1,064,613 6/1913 Coggin ................................ 280/663
1,998,641 4/1935 Shaw .................................. 280/696
2,123,305 7/1938 Hierta ................................. 280/696
4,212,481 7/1980 Ribi .................................... 280/666

Primary Examiner—Joseph F. Peters, Jr.
Assistant Examiner—Ross Weaver
Attorney, Agent, or Firm—Irving M. Weiner; Pamela S. Burt; John L. Shortley

[57] ABSTRACT

A suspension for vehicles which includes a rod supporting on one end thereof a wheel and pivotally connected at the other end thereof to one end of each of a pair of links. The other ends of the links are pivotally connected to a chassis portion or the wheel of the vehicle. The pair of links are relatively inclined at a predetermined angle, so that the rod is operable as if the link-connected end thereof was disposed at an intersection of the longitudinal axes of the links. With such relatively non-complex structure, the vehicle can be prevented from diving at its front end or from rising at its rear end when the vehicle is suddenly braked.

10 Claims, 8 Drawing Figures

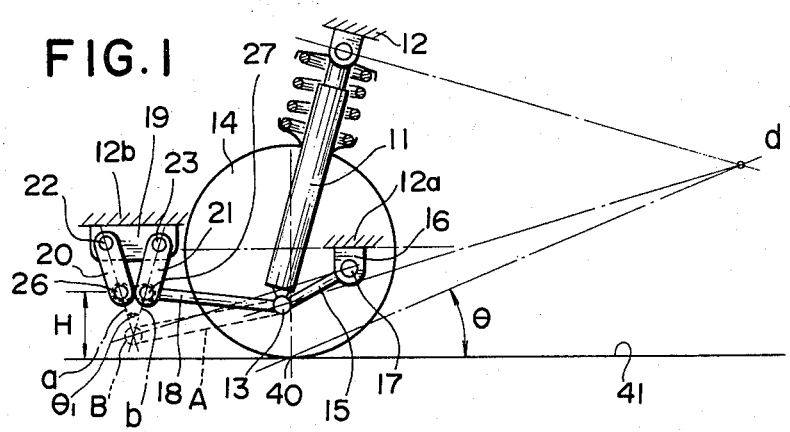
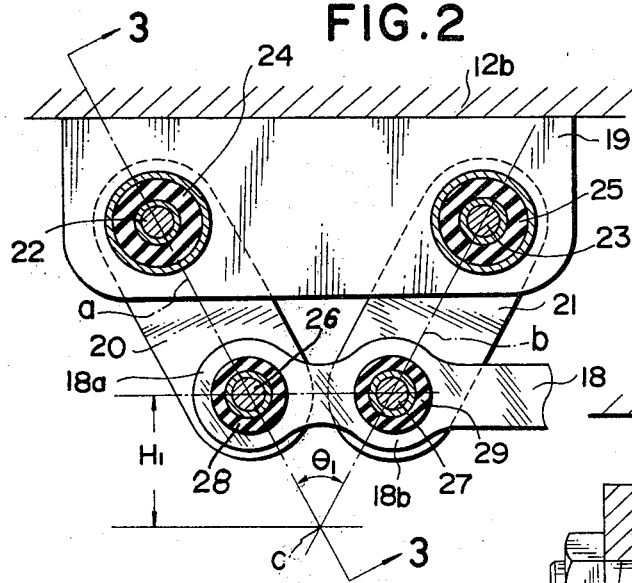
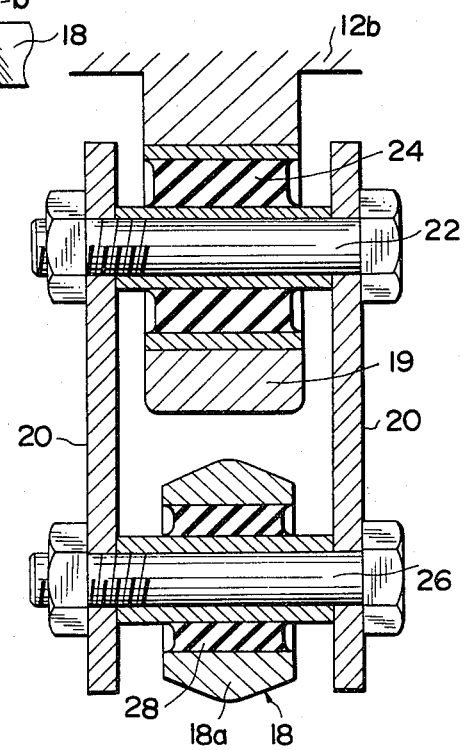

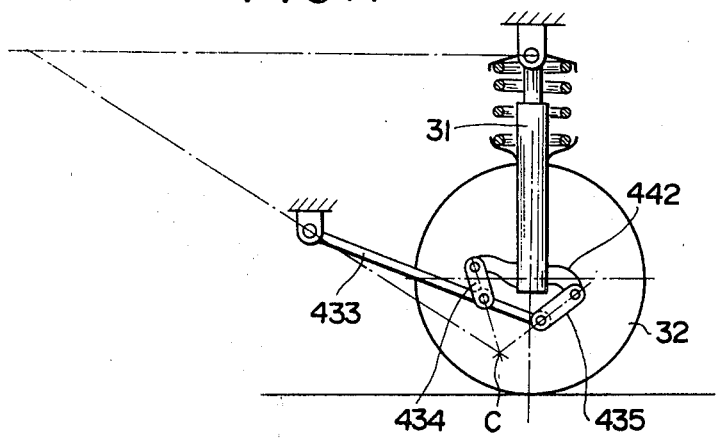
FIG.7
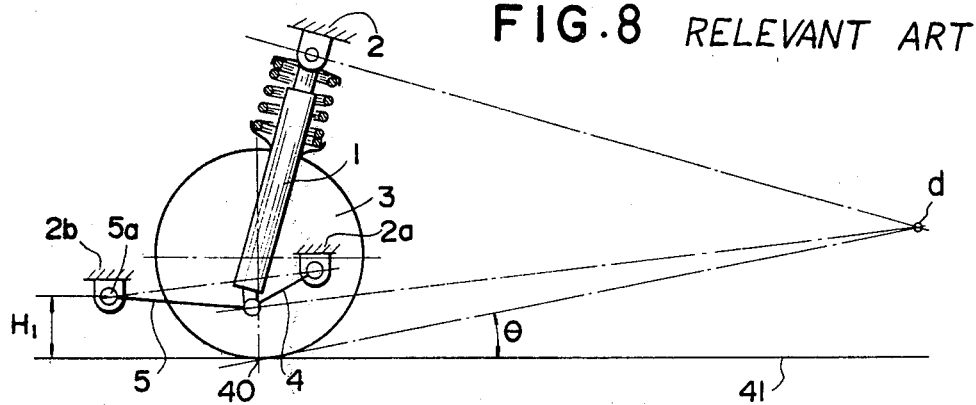
FIG.8 RELEVANT ART

SUSPENSION FOR VEHICLES

BACKGROUND OF THE INVENTION

1. Field of the Invention

The present invention relates to a vehicle suspension for preventing the vehicle from diving at its front end or from rising at its rear end when the vehicle is abruptly braked.

2. Description of Relevant Art

Front and rear wheels of vehicles are normally suspended from the vehicle chassis by means of shock absorbers. When the vehicle is braked suddenly, the vehicle tends to excessively dive at its front end and to rise at its rear end. Various proposals have heretofore been made to prevent such diving and rising of the vehicle. For example, suspensions of the wishbone type have been proposed which have an arm with its axis of pivot inclined in the longitudinal direction of the vehicle.

When relatively rigid shock absorbers are utilized to protect against the aforesaid excessive diving and rising, the riding comfort of the passengers will be sacrificed. Therefore, attempts to prevent vehicle diving rising normally run counter to efforts to improve riding comfort of the passengers.

In FIG. 8 of the accompanying drawings, a front-wheel suspension of the "MacPherson" type is shown, which includes a shock absorber having an upper end supported on spring-supported parts 2 and a lower end connected to a front wheel 3 through a knuckle. The shock absorber 1 is also supported on a chassis portion 2a by a lower arm 4 and on a chassis portion 2b by a radius rod 5 which extends forwardly. With such an arrangement, it is known that by reducing the distance H between the ground 41 and a pivot point 5a at which the radius rod 5 is pivotally supported on the chassis portion 2b, the position of a point d around which the suspension is angularly movable up and down is raised. Consequently, the angle $\theta$ formed between the ground 41 and a line extending between the point d and a point 40 of contact of the wheel with the ground, is increased, thereby dampening excessive diving and rising of the vehicle. However, from the standpoint of arrangement of parts or layout, it is impossible to minimize the distance H in order to make the angle $\theta$ larger because reduction of the distance H beyond a particular limitation will cause interference between the radius rod or other parts therearound and obstructions on the road upon which the vehicle is driven. Accordingly, effective prevention of excessive vehicle diving has not been realized with conventional front-wheel suspension arrangements. With regard to rear-wheel suspension, elevating the position of a pivot for a rod is effective to prevent excessive vehicle rising at the rear end, but the extent of effectiveness thereof is limited due to interference with the spring supported parts of the vehicle.

The present invention effectively solves the above-described problems of vehicle diving and rising when the vehicle is braked suddenly, and the problems associated with vehicle suspensions having rods.

SUMMARY OF THE INVENTION

In accordance with the present invention, a rod such as a radius rod in a vehicle suspension which supports a front-wheel support member is pivotally connected at one end thereof to one end of each of a pair of links which are pivotally supported at the other end thereof on spring supported parts of a vehicle, the links being inclined with respect to each other at a predetermined angle.

With such an arrangement, the rod is operable as if it were pivotally supported at an imaginary intersection of the longitudinal axes of the links, which is sufficiently low in position. Accordingly, the rod effectively functions to prevent vehicle diving at a front end of the vehicle, regardless of the fact that the rod is actually positioned well above the ground.

The present invention is applicable to a rear-wheel suspension in which a rod has a pivotal end portion which is supported on spring-supported parts by a pair of links and is operable at a higher position than it is actually supported, preventing rising of the vehicle at its tail end with a structure which does not interfere with the vehicle chassis.

It is an object of the present invention to provide a vehicle suspension for preventing the diving and rising of the vehicle at its front and rear ends, respectively, when the vehicle is braked suddenly.

It is a feature of the present invention to provide a vehicle suspension which is simple in structure, and employs a minimum number of parts.

The above and other objects, features and advantages of the present invention will become apparent from the following description when read in conjunction with the accompanying drawings which show exemplary preferred embodiments of the invention.

BRIEF DESCRIPTION OF THE DRAWINGS

FIG. 1 is a schematic side elevational view of a suspension constructed in accordance with the present invention.

FIG. 2 is an enlarged side elevational view, with portions in cross section, of a supporting linkage.

FIG. 3 is a cross-sectional view, on an enlarged scale, taken along line 3—3 of FIG. 2.

FIGS. 5 through 7 are schematic side elevational views showing other modified suspensions according to the invention, respectively.

FIG. 8 is a schematic side elevational view of a conventional suspension.

DETAILED DESCRIPTION OF PREFERRED EMBODIMENTS

Figure 4:
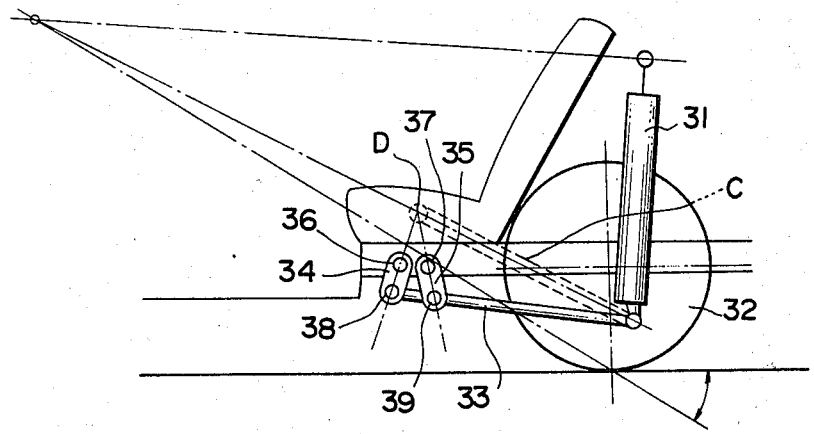
FIG. 4 is a schematic side elevational view of a modified suspension according to the present invention.

With reference to FIG. 1, there is shown a front-wheel suspension of the "MacPherson" type which includes a shock absorber 11 having an upper end connected first portion of a vehicle chassis 12 of spring supported parts and a lower end supporting a front steered wheel 14 of non-spring-supported parts through a knuckle 13. The lower end of shock absorber 11 is also connected through knuckle 13 in a pivotal manner to one end of a lower arm 15 which extends inwardly of the vehicle. The other end of the lower arm 15 is pivotally coupled by a bracket 16 at 17 to a second chassis portion 12a.

A radius rod 18 extends forwardly from the lower end of shock absorber 11, and has one end thereof connected by knuckle 13 to the lower end of shock absorber 11 and the other or front end thereof pivotally connected to a third chassis portion 12b.

According to the present invention, means for supporting rod 18 is provided in the form of a bracket 19 mounted on the chassis portion 12b so as to extend downwardly, and a pair of spaced links 20, 21 are pivotally connected at respective upper first ends thereof to bracket 19 by pins 22, 23. As illustrated in FIG. 2, the upper ends of links 20, 21 are supported on bracket 19 by a pair of respective rubber bushings 24, 25. As shown in FIG. 3 with reference only to links 20 by way of example, the links 20, 21 are provided in two pairs with one pair being disposed on each side of bracket 19. The lower second ends of the links are pivotally connected by pins 26, 27 to a front end portion of radius rod 18. More specifically, the front end portion of radius rod 18 is provided with a pair of longitudinally spaced enlarged portions 18a, 18b for attachment of radius rod 18 to links 20, 21 through rubber bushings 28, 29.

The distance between the axes of pins 22, 23 is larger than the distance between the axes of pins 26, 27. The links 20, 21 thus jointly define a substantially V shape, with a predetermined angle of $\theta_1$ being formed therebetween. The longitudinal axes of links 20, 21 intersect each other at a point C (FIG. 2) coincident with an imaginary supporting point B (FIG. 1) at which is disposed an imaginary chassis-supported pivot pin of an imaginary radius rod A which would desirably be employed were it not for the lack of practicality thereof as described hereinabove.

With such an arrangement, the radius rod 18 is actually held above the road surface 41 at a required distance H, but at the same time is in effect operable as if pivotally supported at point B, which is disposed at a height equal to H minus $H_1$. Accordingly, the angle $\theta$ is relatively large and the poind d around which the shock absorber is angularly movable up and down is raised, with the result that the vehicle can be prevented from diving or being excessively inclined forwardly as a result of sudden braking of the vehicle.

The suspension according to the present invention is applicable to a rear wheel so as to prevent the tail end of the vehicle from suddenly rising when braked.

In FIG. 4, a shock absorber 31 having an upper end thereof supported by a vehicle chassis has a lower end thereof supporting a rear wheel 32. A rod 33 extending forwardly from the lower end of shock absorber 31 is supported on the vehicle chassis. From the standpoint of preventing a sudden rise of the vehicle tail end when braked, it is preferable to raise the rod 33 to the position C shown in dotted lines, but such arrangement is impossible because the support end D would be disposed above a floor of the vehicle. According to the present invention, a front end portion of rod 33 is pivotally connected to a vehicle chassis portion by means of a pair of links 34, 35 attached by upper pins 36, 37 and lower pins 38, 39. The distance between the lower pins 38, 39 is larger than the distance between the upper pins 36, 37. The links 34, 35 thus substantially define an inverted V shape. The links 34, 35 have respective longitudinal axes thereof intersecting each other at a point D.

The rod 33 thus supported by links 34, 35 is operable as if pivotally supported at point D, regardless of the fact that rod 33 is actually disposed below the floor of the vehicle. Accordingly, the tail end of the vehicle is effectively prevented from rising excessively when the vehicle is abruptly braked.

Figure 5:
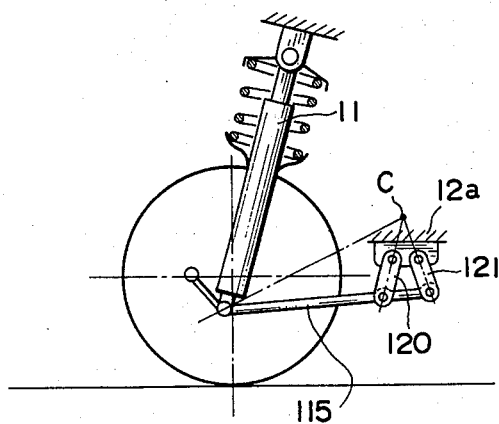

FIG. 5 illustrates a modified front-wheel suspension of the compression rod type. A rod 115 has one end thereof pivotally connected to a shock absorber 11 and the other end portion thereof pivotally supported on a vehicle chassis 12a by a pair of links 120, 121 which define a substantially inverted V shape. The rod 115 is effective to prevent diving since it is equivalent in operation to a rod having a chassis-supported end at a point C which is disposed at an intersection of the longitudinal axes of links 120, 121.

Figure 6:
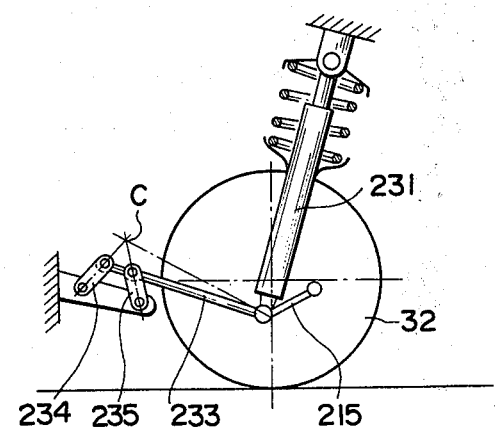

According to another modified rear-wheel suspension shown in FIG. 6, a rear wheel 32 is supported by rod 233, arm 215 and a shock absorber 231. The rod 233 has one end thereof pivotally supported on a chassis portion by a pair of links 234, 235 which jointly define an inverted V shape. The rod 233 is equivalent to being supported at such one end at a point C which is higher than the actual pivot point, with the result that rising of the vehicle is prevented.

In FIG. 7, a further modified suspension is applied to a rear wheel 32 which is supported on a vehicle chassis portion by a shock absorber 31. Means for supporting a radius rod is provided in the form of an arm 442 mounted on a lower end of shock absorber 31 and pivotally supports a pair of links 434, 435 which jointly define a substantially V shape and are pivotally connected to an end portion of a rod 433 pivotally coupled at the other end thereof to a chassis portion. The rear wheel 32 therefore is equivalent to being functionally supported at an intersection C of the longitudinal axes of links 434, 435, for preventing diving of the vehicle. Accordingly, it will be understood that the substantially V-shaped links may be mounted on non-spring supported parts.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a suspension for vehicles including: a shock absorber having an upper end thereof supported on a first portion of a vehicle chassis and a lower end thereof connected to a road wheel; an arm supporting said road wheel, said arm being connected at an end thereof to the lower end of said shock absorber and at the other end thereof to a second portion of said vehicle chassis; and a rod supporting said road wheel, said rod being connected at an end thereof to the lower end of said shock absorber and at the other end thereof to a third portion of said vehicle chassis and extending in the longitudinal direction of said vehicle, the improvement comprising:

a pair of links pivotally connected at first ends thereof to longitudinally spaced positions on either one end of said rod and at second ends thereof to longitudinally spaced positions on an element to which said one end of said rod is connected; and said links having respective longitudinal axes which extend substantially vertically and are inclined relative to each other at a predetermined angle such that said axes of said links intersect at an imaginary supporting point of said rod which is shifted vertically with respect to an actual supporting point of said rod to raise the position of a point around which said shock absorber is angularly movable up and down.

2. A suspension for vehicles according to claim 1, wherein:
said rod supporting means comprises a spring supported part of said vehicle.

3. A suspension for vehicles according to claim 1, wherein:
said rod supporting means comprises a non-spring-supported part.

4. A suspension according to claim 2, wherein:
each of said links includes one end which is pivotally connected to said spring-supported part of said vehicle; and
said rod has one end thereof connected to a non-spring-supported part, and the other end thereof connected to the other end of each of said links.

5. A suspension according to claim 2, wherein:
said rod has the other end thereof connected to one end of said shock absorber.

6. A suspension according to claim 5, wherein:
said rod comprises a radius rod;
said links have a distance therebetween at their upper ends which is substantially larger than a distance therebetween at their lower ends so as to define a substantially V shape; and
said radius rod is pivotally connected to the lower ends of said links having the substantially smaller distance therebetween.

7. A suspension according to claim 5, wherein:
said links have a distance therebetween at their upper ends which is substantially smaller than a distance therebetween at their lower ends so that said links define a substantially inverted V shape; and
said rod is pivotally connected to said links at said lower ends thereof having the larger distance therebetween.

8. A suspension according to claim 5, wherein:
said suspension is substantially of the compression rod type.

9. A suspension according to claim 2, wherein:
said suspension is substantially of the wishbone type;
said rod comprises a lower rod supporting a non-spring-supported part at its upper and lower portions and having one end thereof pivotally connected to one end of each of a pair of links;
the other ends of said links are pivotally connected to said spring-supported part; and
said links are inclined with respect to each other so as to define a substantially V shape.

10. A suspension according to claim 1, wherein:
said means for supporting said rod is mounted on said lower end of said shock absorber; and
the other end of said rod is pivotally connected to said third portion of said vehicle chassis.

* * * * *